(12) United States Patent
Gurusami et al.

(10) Patent No.: US 11,588,295 B2
(45) Date of Patent: Feb. 21, 2023

(54) PUMP MODULATION FOR OPTICAL AMPLIFIER LINK COMMUNICATION

(71) Applicant: II-VI Delaware, Inc., Wilmington, DE (US)

(72) Inventors: Aravanan Gurusami, Morgan Hill, CA (US); Deepak Devicharan, Horseheads, NY (US); Timothy K. Zahnley, Savona, NY (US); Martin R. Williams, Big Flats, NY (US)

(73) Assignee: II-VI Delaware, Inc., Wilmington, DE (US)

( * ) Notice: Subject to any disclaimer, the term of this patent is extended or adjusted under 35 U.S.C. 154(b) by 523 days.

(21) Appl. No.: 16/672,316

(22) Filed: Nov. 1, 2019

(65) Prior Publication Data

US 2021/0135425 A1  May 6, 2021

(51) Int. Cl.
| | | |
|---|---|---|
| H01S 3/13 | (2006.01) | |
| H01S 3/10 | (2006.01) | |
| H04B 10/077 | (2013.01) | |
| H01S 3/094 | (2006.01) | |

(52) U.S. Cl.
CPC .... H01S 3/13013 (2019.08); H01S 3/094003 (2013.01); H01S 3/10015 (2013.01); H04B 10/0777 (2013.01); H01S 2301/04 (2013.01)

(58) Field of Classification Search
None
See application file for complete search history.

(56) References Cited

U.S. PATENT DOCUMENTS

| | | | |
|---|---|---|---|
| 5,668,658 A * | 9/1997 | Hamada | H04B 10/2935 359/341.43 |
| 6,075,633 A * | 6/2000 | Deguchi | H04B 10/298 398/1 |
| 6,411,407 B1 | 6/2002 | Maxham | |
| 6,519,080 B2 | 2/2003 | Vavassori et al. | |
| 6,654,513 B1 | 11/2003 | Liden et al. | |
| 6,731,428 B2 | 5/2004 | Gehlot | |
| 6,798,563 B2 | 9/2004 | Mailhot et al. | |
| 6,850,360 B1 | 2/2005 | Chen et al. | |
| 7,031,606 B2 | 4/2006 | Liu et al. | |
| 7,202,995 B2 | 4/2007 | Fishman et al. | |
| 7,317,570 B2 | 1/2008 | McClean et al. | |
| 9,077,448 B2 | 7/2015 | Hathorn et al. | |
| 9,485,554 B1 | 11/2016 | Kim et al. | |

(Continued)

OTHER PUBLICATIONS

Maini, Handbook of Defence Electronics and Optronics Fundamentals, Technologies and Systems, Wiley. (Year: 2018).*

(Continued)

*Primary Examiner* — Eric L Bolda
(74) *Attorney, Agent, or Firm* — Wendy W. Koba, Esq.

(57) ABSTRACT

A system and method for communicating supervisory information between amplifier nodes in an optical communication network utilizes modulation of an included pump source to superimpose the supervisory information on through-transmitted customer signals (or ASE associated with the amplifier if no customer traffic is present). The supervisory information (which may include monitoring messages, provisioning data, protocol updates, and the like) is utilized as an input to an included modulator, which then forms a drive signal for the pump controller. In a preferred embodiment, binary FSK modulation is used.

16 Claims, 5 Drawing Sheets

(56) References Cited

U.S. PATENT DOCUMENTS

| | | |
|---|---|---|
| 9,544,050 B2 | 1/2017 | Cavaliere et al. |
| 2002/0021473 A1* | 2/2002 | Kasahara .......... H04B 10/0777 398/181 |
| 2003/0035184 A1* | 2/2003 | Deguchi ............ H04B 10/0777 398/177 |
| 2003/0123133 A1 | 7/2003 | Flannery et al. |
| 2016/0006206 A1 | 1/2016 | Kim et al. |

OTHER PUBLICATIONS

Sarkar, Chittajit, "Optical Supervisory Channel Implementation", International Journal of Scientific & Engineering Research, vol. 3, Issue 11, Nov. 2012, pp. 1-3.

* cited by examiner

PUMP MODULATION FOR OPTICAL AMPLIFIER LINK COMMUNICATION

TECHNICAL FIELD

The present invention relates to optical communication networks and, more particularly, to utilizing pump signal modulation to transmit supervisory and control signals between nodes in the network.

BACKGROUND OF THE INVENTION

Optical communication networks typically employ optical amplifiers as in-line amplifiers to boost signal power as the light travels along long lengths of optical fiber (or other types of optical media) from one point in the network to another. In particular, amplifier nodes may be disposed along a link between network termination points, with each node configured to provide bi-directional communication between termination points and thus include a pair of optical amplifiers to boost the signals propagating in both directions. Most amplifier nodes utilize a pair of fiber-based optical amplifiers, either rare-earth-doped fiber amplifiers that are "pumped" with a co-located diode laser, or Raman amplifiers in which high power pumping generates gain through stimulated Raman scattering in an optical fiber.

For proper operation of a link, amplifiers require provisioning information related to loss in the optical link, administration of parameters and control software, as well as monitoring of its parameters, collectively known as "Operation, Administration, and Provisioning (OAM&P). The performance of these fiber-based optical amplifiers can be affected by factors such as aging of components, temperature-induced variations, and the like. Various monitoring techniques are often used to detect and report anomalies so that corrective action can be taken. A separate supervisory optical channel (e.g., telemetry channel) is typically used for monitoring purposes and requires a separate communication link (also referred to at times as the "Control Plane") to be created between amplifier nodes. Other conventional uses of this supervisory channel include network monitoring functions, messaging, maintenance, and so on.

The need to dedicate a specific channel (wavelength) at each node for these supervisory functions adds to the size, cost, and complexity of the communication network.

BRIEF DESCRIPTION OF THE INVENTION

The present invention relates to optical communication networks and, more particularly, to utilizing pump signal modulation to transmit supervisory messages between amplifier nodes in the network.

That is, we have discovered an alternative, cost-effective solution for both amplifying optical signals and communicating status in an optical communication network. More specifically, an optical transmission system according to the principles of the invention includes one or more optical amplifier nodes that provide both amplification of customer signals and bi-directional transmission of supervisory signals without the need for a separate supervisory channel. Instead, the included pump source used to provide amplification is modulated by the supervisory message data in a manner that does not impact the through-passing customer signals. The supervisory messaging data is superimposed on the envelope of the amplified customer signals and is propagated in this fashion to the next amplifier located downstream. This downstream node includes a paired demodulator that functions to recover the supervisory message data from the envelope of the customer signals.

In accordance with the principles of the present invention, supervisory message data previously transmitted over a separate supervisory channel is instead used to modulate the drive current used to energize the amplifier's pump source. The modulation is superimposed on the enveloped of the amplified customer signals propagating from one node to another, and is scaled so that the integrity of the customer signals is not affected. At the receiving amplifier node, a paired demodulator is used to recover the supervisory message data and use this information in the same manner as in the prior art. Advantageously, both modulating and demodulating functions are preferably implemented in signal processing software elements to minimize the impact on the size of the amplifier node itself.

An amplifier node is particularly configured to include both a pump modulator (to impress supervisory message data on out-going amplified customer signals) and a demodulator (to recover incoming supervisory message data present on a received amplified signal), thus providing bi-directional transmission of network control signals between amplifier nodes. Advantageously, the use of pump modulation to transmit these signals allows for the amplifier nodes to perform self-provisioning upon installation, based upon the signals transmitted between a pair of nodes (i.e., providing the proper gain/power levels) when first energized.

In an exemplary embodiment, binary FSK modulation is used, with a software-based modulator employing two sinusoidal waves operating at different frequencies that are impressed on the pump as a function of the supervisory message (digital) data values to be transmitted. The related demodulator utilizes envelope detection to recover the transmitted digital supervisory message data.

In further accordance with the principles of the present invention, a scaling element may be included in the FSK modulator at the input to the pump driver to ensure that the modulation depth (power envelope) of the amplified customer data stays below a threshold that would otherwise introduce errors in the transmitted customer data. A scaling element is preferably also included in the FSK demodulator at the downstream node, since amplification in a rare-earth doped amplifier is frequency dependent and the output envelopes used by the included decision circuit may exhibit very different peak values. Thus, the scaling element is used at the demodulator to equalize the peak amplitudes of the two envelope detected signals and reduce the possibility of errors at the output of the detection circuit.

It is contemplated that pump modulation may be used to transmit various types of data between amplifier nodes, not only supervisory information but changes in protocols; for example, information transmitted at the data link level.

Moreover, in the absence of customer signal traffic (such as in the initial installation of an amplifier node in the network), the amplified spontaneous emission (ASE) created by the amplifying component itself may be used as the "signal" upon which the supervisory message data is transmitted. In this case of initial provisioning of an amplifier node, the supervisory messages may be particularly associated with determining optimum pump parameters for the given node location.

One particular embodiment of the present invention takes the form of apparatus included within an optical amplifier node for providing bi-directional communication of network information between optical amplifier nodes within an optical communication network. Each amplifier within the optical amplifier node is formed as a fiber-based optical amplifier that utilizes a pump source for imparting gain onto a customer signal. In particular, the inventive apparatus includes a modulator responsive to supervisory message data for generating a modulation output signal that is applied as an input to a pump driver of a first fiber-based optical amplifier within the optical amplifier node, forming a modulated pump output for amplifying the customer signal (where the modulation appears as an envelope on the amplified customer signal), and a demodulator coupled to an output from a second fiber-based optical amplifier within the optical amplifier node, the demodulator receiving as an input an electrical version of the received optical signal and recovering therefrom the supervisory message data superimposed on the received customer signal.

Another embodiment of the present invention is defined as a method of communicating supervisory message data from a first fiber-based optical amplifier node to a second fiber-based optical amplifier node. The inventive method includes the steps of: (1) receiving supervisory message data in digital form; (2) modulating a pump driver circuit with the received supervisory message data to create a modulated output; (3) applying the modulated output to a pump source, generating a pump output with a modulated optical power; (4) combining the modulated optical power with a customer signal provided as an input to the first fiber-based optical amplifier; (5) creating a modulated, amplified optical output from the first fiber-based optical amplifier node; and (6) transmitting the modulated, amplified optical output to the second fiber-based optical amplifier node.

Other and further embodiments and aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
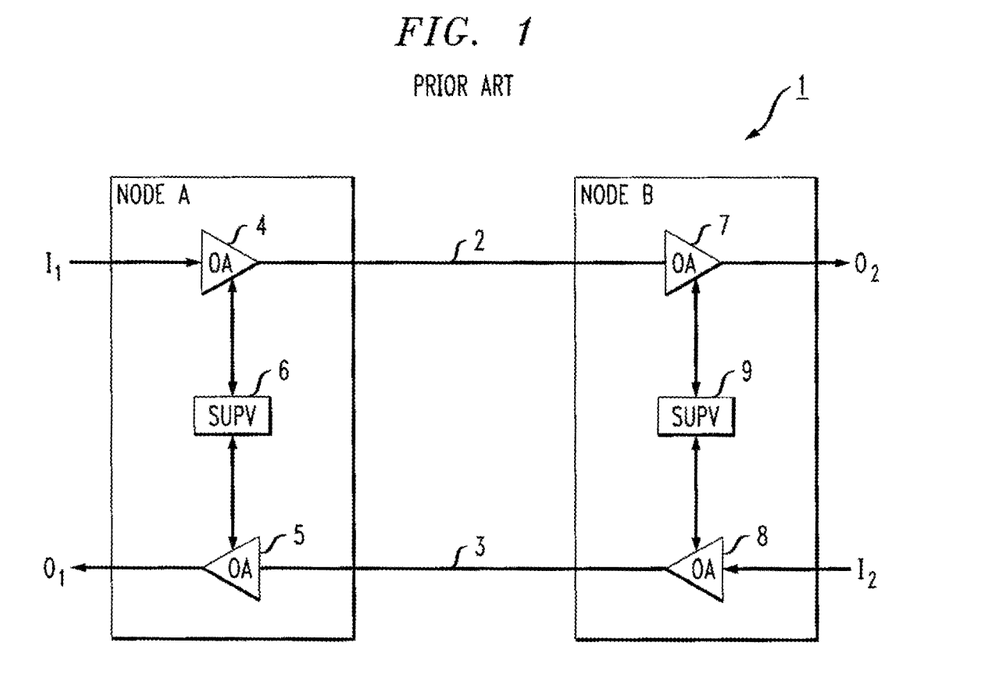
FIG. 1 illustrates an exemplary prior art use of an optical supervisory channel to provide link-to-link monitoring between amplifiers in an optical communication system.

FIG. 1 shows an illustrative prior art configuration of a pair of optical nodes A, B as typically found in an optical communication network 1, with a pair of optical fibers 2, 3 used to provide bi-directional communication between node A and node B. In this example, optical communication network 1 is configured to provide west-to-east communications via optical fiber 2 and east-to-west communications via optical fiber 3.

Node A includes a first optical amplifier 4 for receiving information-bearing optical signals $I_1$ (hereinafter referred to as "customer signals"), amplifying the customer signals, and coupling these amplified signals into optical fiber 2 for the west-to-east propagation to node B. Node A also includes a second optical amplifier 5 for receiving and amplifying customer signals arriving from Node B in the east-to-west direction along optical fiber 3 and supplying these amplified signals as output signals $O_1$. As mentioned above, node A also includes a supervisory unit 6 for providing the necessary supervisory and telemetry functions associated with optical amplifiers. The operation of supervisory unit 6 is well known to those skilled in the art and is used to facilitate messaging across a supervisory data link established between optical components such as optical amplifiers and the like. As previously indicated, this prior art supervisory data link takes the form of a separate channel from the information-bearing customer signals, and as a result requires components (and component space), at an additional cost, within each amplifier node.

Similarly, Node B includes optical amplifiers 7 and 8 for receiving, amplifying, and supplying optical signals in the respective directions along optical fiber paths 2 and 3, respectively. More specifically, node B receives information-bearing optical signals $I_2$ (i.e., customer signals), amplifies these customer signals within optical amplifier 8, and supplies the amplified signals along optical fiber path 3 in the east-to-west direction to node A. Optical amplifier 7 receives and amplifies optical signals arriving from node A on optical fiber 2 and supplies the amplified signals as output signals $O_2$. Node B also includes a supervisory unit 9 for carrying out similar functions as those described for the corresponding element in node A.

As previously indicated, the supervisory signal is typically used for messaging, alarm reporting, and so on between nodes A and B. For example, optical amplifier 4 in node A may receive a counter-propagating supervisory signal, filter it out of the information-bearing customer signals, and provide it to supervisory unit 5 to facilitate control of node A (in conjunction with a controller, not shown). The same principles of operation apply for communication in optical fiber path 3 involving the respective components of nodes A and B.

As shown in FIG. 1, conventional systems require processing of the supervisory signal at each optical amplifier location. Because of the extra components required in the optical amplifiers and the potentially large number of optical amplifiers in a transmission system, the cost of the individual amplifiers is typically a cost driver for the overall system.

Figure 2:
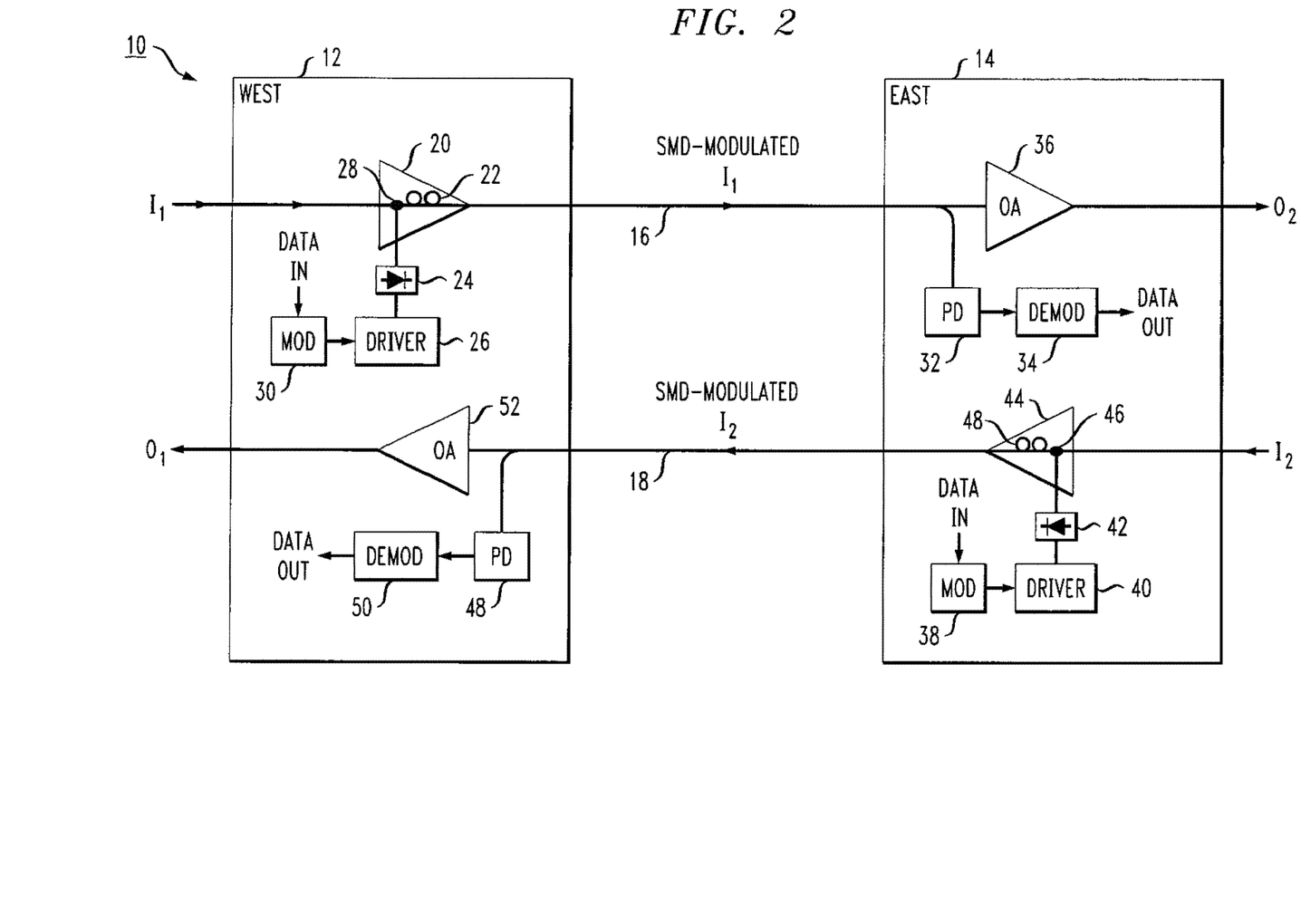
FIG. 2 is a block diagram of a pair of optical amplifier nodes configured to use pump modulation for bi-directional supervisory communication in accordance with the principles of the present invention.

FIG. 2 is a high level diagram of a portion of an optical communication network 10, in particular illustrating a pair of amplifier nodes 12, 14 formed in accordance with the present invention to utilize pump modulation for bi-directional signaling of supervisory message data (as well as, perhaps, other non-customer network management commands and messages) between the amplifier nodes. A first optical fiber 16 is used to support the "west-to-east" transmission of optical signals from first amplifier node 12 to second amplifier node 14, and a second optical fiber 18 is used to support the "east-to-west" transmission of optical signals from second amplifier node 14 to first amplifier node 12. For the purposes of the present invention, the term "bi-directional" refers to the establishment of signal paths for supervisory messages to travel in each direction between a given pair of amplifier nodes. It is to be understood that these "bi-directional" supervisory messages propagate along (uni-directional) optical fibers 16 and 18; the combination of optical fibers 16 and 18 thus forming the bi-directional link for the transmission of supervisory messages between a pair of adjacent nodes.

As with the conventional operation of an amplifier node as discussed above, customer signals $I_1$ entering first node 12 are passed through an optical amplifier 20 to boost the power in these signals before being coupled into optical fiber 16 and transmitted along to second node 14. Optical amplifier 20 is shown in this embodiment to take the form of a doped-fiber amplifier, including a section of rare-earth doped gain fiber 22. Also shown in this view is a pump source 24 (e.g., a laser diode operating at a known pump wavelength, such as 980 nm for Er-doped fiber) and a pump driver 26 used to provide the input drive signal to pump source 24 and energize the laser diode. A wavelength division multiplexer (WDM) 28 is included in optical amplifier 20 to combine this pump light with the incoming customer optical signals, providing their combination as the input to gain fiber 22, where the presence of the pump light results in amplifying (increasing the power level) of the customer signals.

In accordance with the principles of the present invention, a modulator 30 is included within first optical amplifier node 12 and is used to modulate the drive current provided by pump driver 26. The modulation is based on the supervisory message data (shown as "DATA IN") that is to be transmitted from first node 12 to second optical amplifier node 14 (i.e., the data that was previously transmitted over a separate, out-of-band supervisory channel). In particular, modulator 30 receives the supervisory information data as an input and utilizes this data to modulate the pump drive signal. As a result, the amplification experienced by the customer signals is varied as a function of this modulation, which may take the form of an envelope superimposed on the amplified customer signals, as will be described in detail herein below.

The modulated, amplified customer signals thereafter propagates along optical fiber 16 and is received by second optical amplifier node 14, as in the conventional node-to-node transmission process. In accordance with the principles of the present invention, however, a portion of the received signal is tapped out and converted into an electrical equivalent E by an included photodiode 32. Electrical signal E is subsequently applied as an input to a demodulator 34 (configured to match the functioning of modulator 30) to recover the actual supervisory message data transmitted from first node 12 to second node 14.

The majority of the received customer signals is passed through a first optical amplifier 36 included within second node 14 to boost the power of the customer signals prior to exiting node 14 as output signal $O_2$.

In order to provide a complete, bi-directional communication path, second node 14 includes a modulator 38 that is responsive to its own "local" supervisory message data that is to be transmitted back to first node 12. As with the configuration discussed above, modulator 38 uses this supervisory message as "DATA IN" to modulate a pump driver 40 that is used to energize an included pump source 42. Here, both an incoming set of customer signals $I_2$ and the modulated pump light are applied as inputs to a fiber-based amplifier 44. In particular, the customer signals $I_2$ and pump light are combined within a WDM 46 and introduced into a gain fiber 48. Thus, the data values of the supervisory message is used to modulate the amplification of the customer signals, exhibited as superimposed on a power envelope of the customer signals, which is thereafter coupled into optical fiber 18 for transmission to first optical amplifier node 12.

A photodetector 48 and associated demodulator 50 are included in first optical amplifier node 12 to respond to an out-coupled portion of this incoming signal on optical fiber 18 and recover the particular supervisory message information being transmitted from second optical amplifier node 14 to first optical amplifier node 12. As shown in FIG. 2, a majority of the incoming customer signals $I_2$ is directed into an optical amplifier 52 to be boosted before exiting as output customer signal $O_1$.

Figure 3:
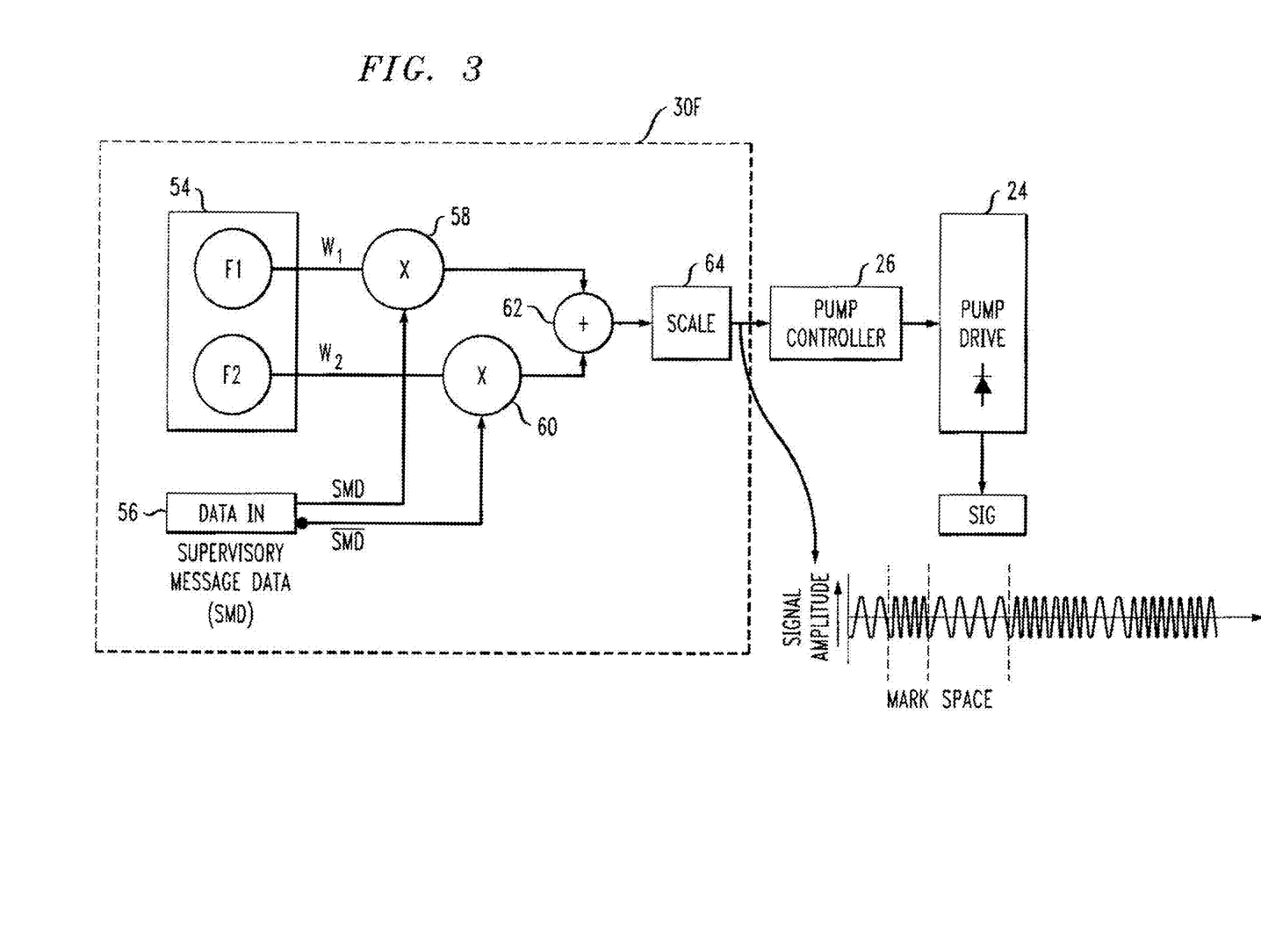
FIG. 3 shows an exemplary configuration of a modulator arrangement that may be used to control a pump source, superimposing supervisory message data onto customer signals in accordance with the present invention.

FIG. 3 illustrates an exemplary configuration of a modulator that may be used to impress supervisory message data on the pump signal used to amplify customer signals in the manner described above. In particular, FIG. 3 illustrates an exemplary frequency-shift keying (FSK) modulator 30F that is particularly well-suited for this application, superimposing a sinusoidal modulation on the envelope of the customer signals passing through the amplifier. As will be described below, the magnitude of the modulation power impressed on the customer signals is controlled to ensure that the power envelope of the (modulated) amplified customer signals does not exceed a threshold that would otherwise introduce bit errors in the customer data. For example, a modulation depth of 0.5 dB has been found satisfactory in accurately transmitting supervisory message data while maintaining the integrity of the customer signals used to support the transmission of this supervisory information.

In particular, modulator 30F takes the form of a binary FSK modulator that utilizes a pair of sinusoidal-based waveforms $W_1$ and $W_2$, stored in an on-chip memory element 54. Memory element 54 is particularly shown as providing as separate outputs the first sinusoidal waveform $W_1$ (operating at a fixed frequency $f_1$) and the second sinusoidal waveform $W_2$ (operating at a different fixed frequency $f_2$). The incoming supervisory message data (hereinafter defined as "SMD") is digital in form and is used to switch between the transmission of waveform $W_1$ and waveform $W_2$ as a function of the logic value to be transmitted.

A particular configuration of a suitable switching arrangement is shown in FIG. 3 as including a data interface 56, which provides a pair of outputs in the form of the original supervisory stream SMD and a complement stream $\overline{SMD}$. Original stream SMD is thereafter applied as a first input to a first multiplier 58, where a second input is the first sinusoidal waveform $W_1$. In a similar manner, complement stream $\overline{SMD}$ is thereafter applied as a first input to a second multiplier 60, with second sinusoidal waveform $W_2$ applied as a second input.

Thus, in accordance with the principles of binary FSK modulation, an incoming SMD signal have a logic value "1" will be modulated by first frequency $f_1$, and data of a logic "0" value will be modulated by second frequency $f_2$. The two modulated streams are then combined within an adder 62 to provide the carrier modulation output of modulator 30F that is applied as an input to pump driver 26 to control the power of the pump light entering amplifier 20. Said another way, the "raw" SMD incoming digital stream is used to switch between the two frequencies $f_1$ and $f_2$ applied as the input to the pump driver 26. An exemplary form of an output from modulator 30F applied as an input to pump driver 26 is also shown in FIG. 3

In preferred embodiments of the present invention, FSK modulator 30 also includes a scaling element, shown as scaling element 64 in FIG. 3. As mentioned above, scaling element 64 is used to control the magnitude of the modulated signal so that the envelope of the modulated customer signal does not exceed a given threshold. A modulation depth of 0.5 dB has been found to be acceptable.

Figure 4:
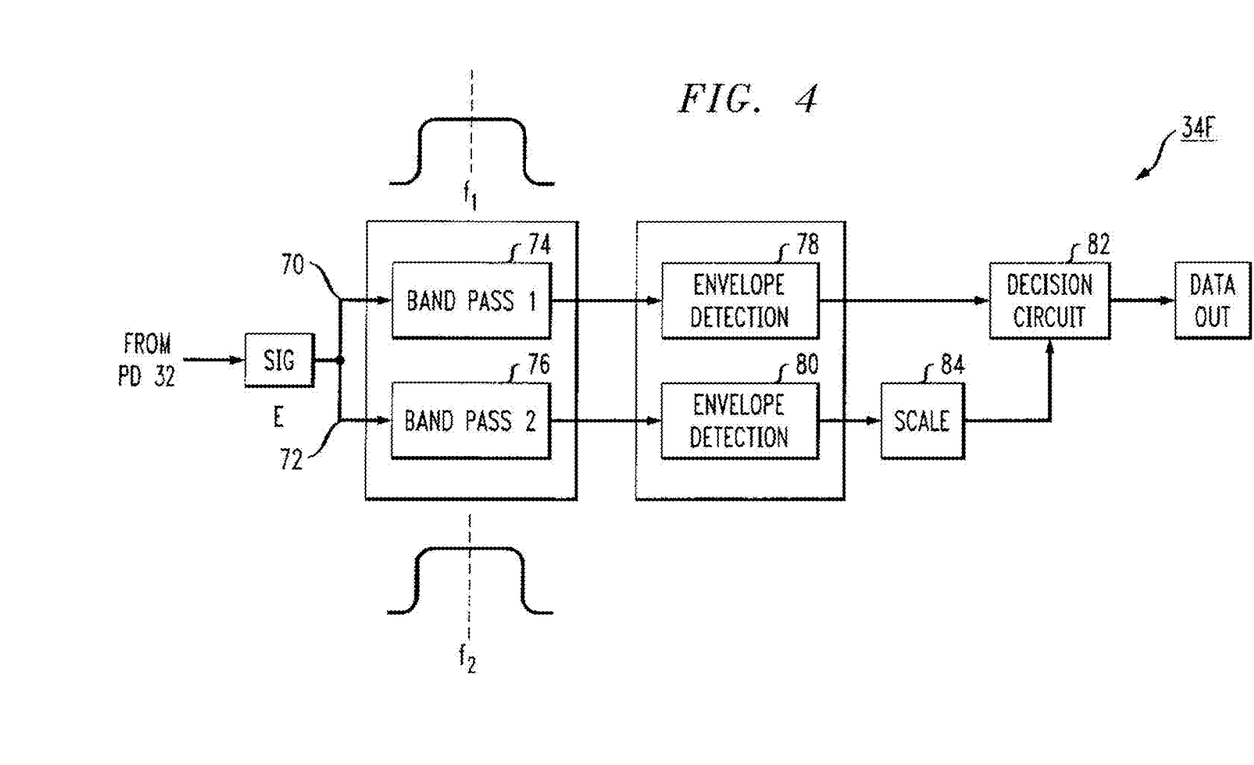
FIG. 4 shows an exemplary configuration of a demodulator arrangement for use in combination with the modulator arrangement of FIG. 4 to recover supervisory message data that has been sent from a first optical amplifier node to a second optical amplifier node.

An exemplary demodulator 34 particularly configured for use with FSK modulator 30F is shown in FIG. 4. In this arrangement, a non-synchronous FSK demodulator 34F is used to process the converted electrical version of the modulated, amplified customer signal received at an amplifier node. That is, with reference to FIG. 2, a portion of the incoming modulated customer signal received at second optical amplifier node 14 is first converted into an electrical signal version E by included photodiode 32, with electrical signal E thereafter applied as the input to FSK demodulator 34F.

Turning to the particulars of FSK demodulator 34F, the FSK-modulated electrical signal E uses conventional bandpass filtering typical in FSK modulation to determine the proper frequency (i.e., $f_1$ or $f_2$) used for the specific received data bit. That is, input E is applied along parallel paths shown here as paths 70 and 72. Path 70 includes a first bandpass filter 74, centered at frequency $f_1$, and path 72 includes a second bandpass filter 76, centered at frequency $f_2$. The passband (i.e., bandwidth) of filters 74, 76 is typically relatively narrow and may be set empirically (i.e., a higher filter Q will provide a sharper passband, at the expense of a longer lag in tracking the signal, which a lower filter Q will increase the responsivity of the demodulator, at the expense of perhaps introducing errors in the recovered supervisory message data). The outputs from bandpass filters 74, 76 will discern if there is a tone (if that frequency is associated with the current signal value), or remain at a zero output level. A separate envelope detector is disposed at the output of each bandpass filter, shown as a first envelope detector 78 disposed at the output of first bandpass filter 74 and a second enveloped detector 80 disposed at the output of second bandpass filter 76. The responses from detectors 78, 80 are thereafter applied as separate inputs to a decision circuit 82, which thereafter provides a reconstructed version of the original digital supervisory information. In preferred embodiments, a scaling element 84 is disposed along one of the signal paths (here, shown as along path 72) and is used to equalize the peak values produced by the pair of envelope detectors 78, 80.

As mentioned above, one significant advantage of pump modulation message signaling is the ability to use this type of messaging to enable self-provisioning for a new amplifier node installation. That is, using messaging between a pair of nodes and the local measurements, the amplifiers can be configured to perform set-up in terms of pump power levels. Since no customer traffic is yet passing through these nodes, the amplified spontaneous emission (ASE) generated by activation of the pump laser diodes and the response of the optical amplifier components is used as the "signal" upon which the provisioning message data is superimposed. Considered as "noise", the ASE is still a signal in a form where the supervisory messaging data can be used to modulate to the pump driver so as to superimpose the data on the envelope of the ASE itself. No additional hardware is required beyond what is already available at a typical amplifier node. Thus, the pump modulation scheme of the present invention may be used to transmit supervisory messages between amplifier nodes, perform dynamic link set-up, and perhaps also transmit higher-level message protocols, allowing this information to be sent from one amplifier node to another in one direction from a given network access point to another access point.

In various applications of the present invention, it is anticipated that certain messages transmitted between a pair of amplifier nodes do not need to continue to propagate along a signal path to other downstream amplifier nodes (or other network elements), the self-provisioning discussed above being one example of this type of "local" messaging. In these situations, it may be preferable to utilize active filtering of a modulated, amplified (received) customer signal to remove the SMD modulating envelope prior to re-introducing the propagating customer signal into the network signal path. Without some means for removing the superimposed SMD, it would otherwise remain as an artifact on the customer signal as it propagates through the network. Indeed, this remaining modulation may subsequently be impacted by a "new" supervisory message that a particular amplifier node desires to transmit downstream to the next node in the sequence. Clearly, without any type of filtering, these supervisory messages would continue to build up along a signal path within the optical communication network.

Figure 5:
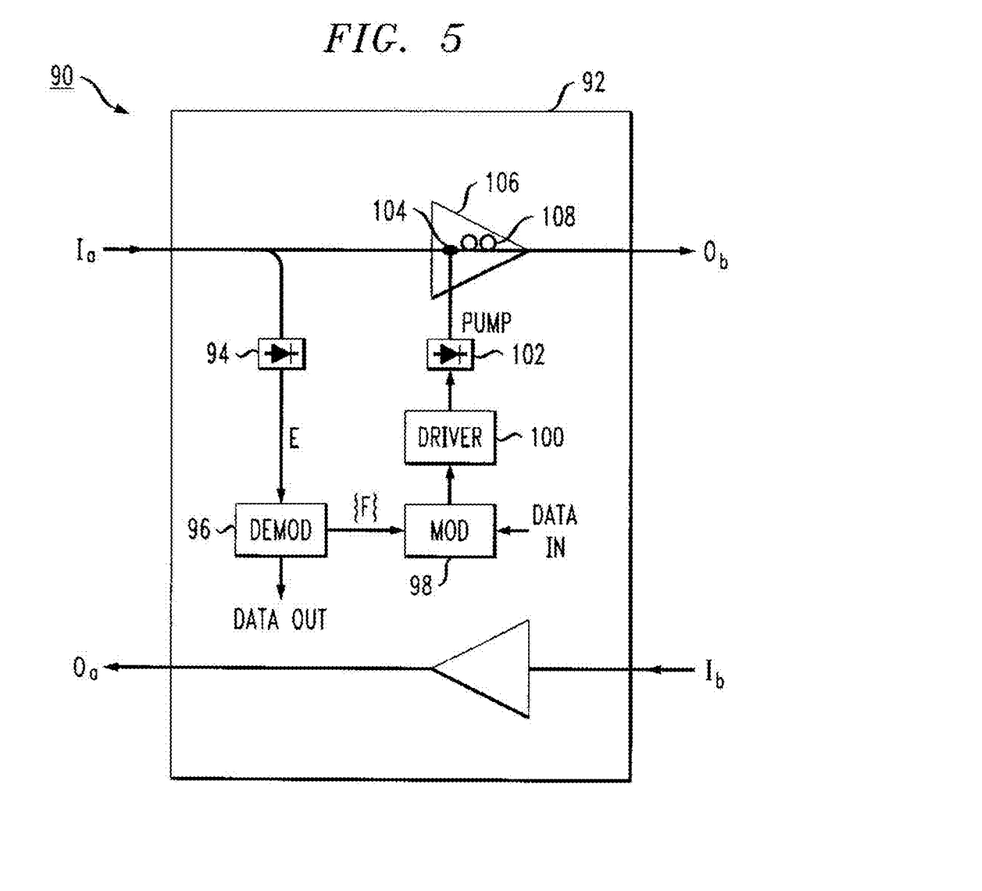
FIG. 5 illustrates an exemplary configuration utilizing active filtering in combination with a demodulator arrangement.

FIG. 5 illustrates a portion of an optical communication network 90 using active filtering to minimize the continual propagation of SMD that is contemplated as only needing to be transmitted between a defined pair of nodes. In particular, FIG. 5 illustrates a portion of an exemplary optical amplifier node 92, which is considered to be a "receive" node, similar to second optical amplifier node 14 described above, where the optical input received by node 92 is a customer signal $I_a$ including SMD superimposed on its envelope in the manner described above. Similar to the configuration described above, a portion of this message-modulated input customer signal $I_a$ is out-coupled and applied as an input to a photodetector 94 to create an electrical version E of the received signal, with the electrical version E then demodulated within an included demodulator 96 to recover the transmitted supervisory message ("DATA OUT").

In accordance with this embodiment of the present invention, the information related to the recovered SMD is used in an active filtering mode to eliminate the presence of this modulating envelope on the actual customer signal that is passing through node 92. In the embodiment shown in FIG. 5, this recovered data stream is provided as an input to an included modulator 98. Modulator 98 may, for example, use the inverse of the recovered data to provide a modulation signal that will essentially cancel out the SMD signal riding on the envelope of the propagating customer signal. The output from modulator 98 is used as an input to a pump driver circuit 100, which then provides a modulating control signal to an included pump laser diode 102 in the same manner as discussed above.

The modulating pump output is then combined with the received customer signal $I_a$ in a WDM 104 within a fiber-based optical amplifying component 106, with the combination of signal and modulated pump thereafter passed through a section of rare earth-doped gain fiber 108 to provide a "clean" output customer signal $O_b$ ("clean" in this case meaning that the residual SMD has essentially been removed).

In arrangements where it is desired to inject a "new" supervisory message for transmission to a following node, the "DATA IN" is applied to modulator 98, which then processes both this new data and the need to remove the old data in a manner such that modulating envelope superimposed on output customer signal $O_b$ represents only the new information.

Figure 6:
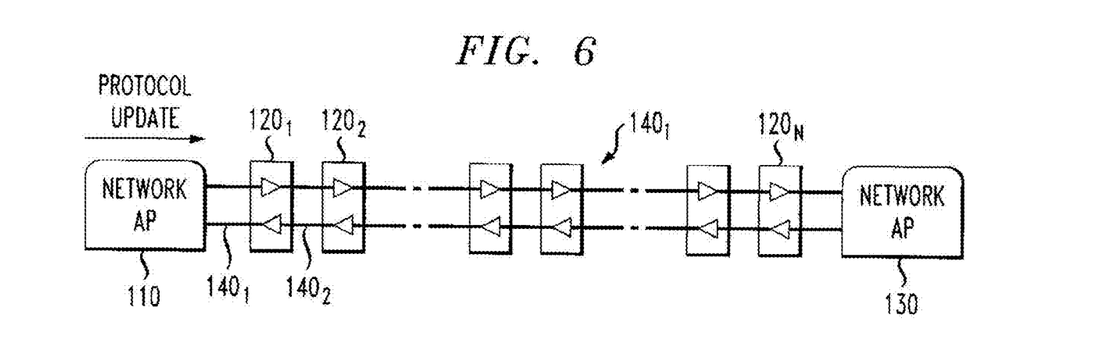
FIG. 6 contains a simplified diagram of a portion of an optical communication network that utilizes pump modulation in accordance with the teachings of the present invention to transmit high-level protocol information from a first network access point to a second network access point through one or more optical amplifier nodes.

FIG. 6 illustrates yet another embodiment of the present invention, in this case where it is desirous to continue to transmit the same "supervisory" message along a set of concatenated amplifier nodes disposed along a link between a pair of network access points. Thus, in contrast to the configuration shown in FIG. 5 where the received/recovered supervisory data is intentionally removed from the propagating customer signal, in this case the same superimposed modulation is maintained as the customer signal propagates through the network.

In particular, FIG. 6 illustrates an arrangement where it is presumed that a first network access point 110 needs to update certain protocol information at a plurality of amplifier nodes $120_1, 120_2, \ldots, 120_N$ disposed between first network access point 100 and a second network access point 130. In accordance with the principles of the present invention as discussed above, this protocol information is superimposed on the customer signal exiting first network access point 100, and thereafter propagates along links $140_1, 140_2$, to second network access point 130. Each intervening amplifier node $120_i$ will recover this protocol update and adjust its operations accordingly (as will second network access point 130). No "active filtering" is used to remove the protocol information from the propagating customer signal.

The foregoing embodiments are merely illustrative of the principles of the present invention. Those skilled in the art will be able to devise numerous arrangements, which although not explicitly shown or described herein, nevertheless embody the spirit and scope of the present invention. Such modifications are therefore contemplated by the teachings herein as not limiting the scope of the present invention as defined by the claims appended hereto.

What is claimed is:

1. Apparatus included within an optical amplifier node for providing communication of network information between optical amplifier nodes within an optical communication network, each amplifying component within the optical amplifier node taking the form of a fiber-based optical amplifier using a pump source for imparting gain onto an optical signal passing therethrough, the apparatus comprising
    a modulator responsive to supervisory message data applied as an input to the optical amplifier node for generating a modulation output signal thereafter applied as an input to a pump driver of a first fiber-based optical amplifier within the optical amplifier node, forming a modulated pump output for amplifying the optical signal present within the first fiber-based optical amplifier, where the modulation appears as an envelope on the amplified optical signal provided as an output of the optical amplifier node; and
    a demodulator coupled to a second fiber-based optical amplifier within the optical amplifier node, the demodulator paired with an upstream modulator in an upstream optical amplifier node and receiving as an input an electrical version of a received optical signal from the upstream optical amplifier node and recovering therefrom a received supervisory message data superimposed on the received optical signal.

2. Apparatus as defined in claim 1 wherein the modulator comprises a binary FSK modulator for providing a sinusoidal waveform of a first frequency $f_1$ as an input to the pump driver for a first logic value of the supervisory message data and a sinusoidal waveform of a second frequency $f_2$ as an input to the pump driver for a second logic value of the supervisory message data.

3. Apparatus as defined in claim 2 wherein the demodulator utilizes a pair of parallel signal paths, a first signal path including a bandpass filter centered at a third frequency $f_3$ and a second signal path including a bandpass filter centered at a fourth frequency $f_4$, to recover the received supervisory message data from the upstream optical amplifier node.

4. Apparatus as defined in claim 3 wherein each demodulator signal path further comprises an envelope detector disposed at the output of the bandpass filter, and the demodulator further comprises a threshold decision circuit coupled to the outputs of each envelope detector and provides as an output the recovered received supervisory message data based upon the operation of the threshold decision circuit.

5. Apparatus as defined in claim 4 wherein a demodulator signal path further includes a scaling element to modify an amplitude of the envelope detector output such that the outputs from each envelope detector exhibit essentially the same peak value.

6. Apparatus as defined in claim 2 wherein an on-chip module stores the pair of waveforms operating at frequencies $f_1$ and $f_2$.

7. Apparatus as defined in claim 2 wherein the modulator further comprises a scaling component to adjust a power level of the modulation envelope to maintain the optical signal power below a predetermined threshold level.

8. Apparatus as defined in claim 1 wherein the optical signal present within the first fiber-based optical amplifier comprises customer signals propagating through the optical communication network.

9. Apparatus as defined in claim 1 wherein the optical signal present within the first fiber-based optical amplifier comprises amplified spontaneous emission associated with the introduction of a pump input to the first fiber-based optical amplifier.

10. Apparatus as defined in claim 1 wherein the apparatus further comprises an active filtering element, coupled to the demodulator, for using the recovered supervisory message data to create a filter response for removing the superimposed supervisory message data from the optical signal prior to providing the optical signal as an output of the optical amplifier node.

11. A method of communicating supervisory message data from a first optical amplifier node to a second optical amplifier node, including
    receiving supervisory message data in digital form as an input applied to the first optical amplifier node;
    modulating a pump driver circuit with the received supervisory message data to create a modulated output;
    applying the modulated output to a pump source associated with a first fiber-based amplifier within the first optical amplifier node, generating a pump output with a modulated optical power;
    combining the modulated optical power with an optical signal present in the first fiber-based amplifier;
    creating a modulated, amplified optical output from the first fiber-based amplifier;
    transmitting the modulated, amplified optical output to the second optical amplifier node;
    at the second optical amplifier node, out-coupling a portion of modulated, amplified optical output received from the first optical amplifier node;
    converting the out-coupled portion into an electrical equivalent signal; and demodulating the electrical equivalent signal to recover the supervisory message data.

12. The method as defined in claim 11 wherein binary FSK modulation is performed on the received supervisory message data.

13. The method as defined in claim 11 wherein the method further comprises the step of
filtering the modulated, amplified optical output received from the first optical amplifier node to remove the supervisory message data superimposed on the propagating optical signal prior to re-introducing the propagating optical signal back into the optical communication network.

14. The method as defined in claim 11 wherein binary FSK modulation is performed on the received supervisory message data at the first optical amplifier node and non-synchronous FSK demodulation is performed on the electrical equivalent signal at the second optical amplifier node.

15. The method as defined in claim 11 wherein the optical signal present in the first fiber-based amplifier is customer data signals being transmitted within the optical communication network.

16. The method as defined in claim 11 wherein the optical signal present in the first fiber-based amplifier is amplified spontaneous emission associated within the presence of the pump energy within the first fiber-based amplifier.

\* \* \* \* \*